United States Patent
Swinney et al.

(10) Patent No.: US 10,537,849 B2
(45) Date of Patent: Jan. 21, 2020

(54) PROCESS FOR REMOVING $CO^2$ FROM CRUDE NATURAL GAS

(71) Applicant: JOHNSON MATTHEY DAVY TECHNOLOGIES LIMITED, London (GB)

(72) Inventors: John Swinney, Durham (GB); Simon Nicholas Tilley, Durham (GB); David J. Watson, Durham (GB)

(73) Assignee: Johnson Matthey Davy Technologies Limited, London, England (GB)

(*) Notice: Subject to any disclaimer, the term of this patent is extended or adjusted under 35 U.S.C. 154(b) by 192 days.

(21) Appl. No.: 15/556,440

(22) PCT Filed: Feb. 26, 2016

(86) PCT No.: PCT/GB2016/050510
§ 371 (c)(1),
(2) Date: Sep. 7, 2017

(87) PCT Pub. No.: WO2016/142649
PCT Pub. Date: Sep. 15, 2016

(65) Prior Publication Data
US 2018/0043299 A1    Feb. 15, 2018

(30) Foreign Application Priority Data

Mar. 11, 2015 (GB) .................................. 1504130.4

(51) Int. Cl.
*B01D 53/22* (2006.01)
*B01D 53/86* (2006.01)
(Continued)

(52) U.S. Cl.
CPC ......... *B01D 53/229* (2013.01); *B01D 53/864* (2013.01); *B01D 53/8696* (2013.01);
(Continued)

(58) Field of Classification Search
CPC .. B01D 53/1475; B01D 53/22; B01D 53/225; B01D 53/226; B01D 53/227;
(Continued)

(56) References Cited

U.S. PATENT DOCUMENTS 8,999,038 B2 * 4/2015 Ungerank ............ B01D 53/226
95/51
2010/0186586 A1   7/2010 Chinn et al.
(Continued)

FOREIGN PATENT DOCUMENTS

AU    2009263401 A1 * 12/2009 ............. B01D 53/94
CN    101206207 A    6/2008
(Continued)

OTHER PUBLICATIONS

English language machine translation of WO 2009/157434 A1. Retrieved from https://www.j-platpat.inpit.go.jp/p0200 on May 16, 2019. (Year: 2019).*

(Continued)

*Primary Examiner* — Jason M Greene
(74) *Attorney, Agent, or Firm* — BakerHostetler (57) ABSTRACT

A method for treating a crude natural gas feed stream comprising methane and having a first carbon dioxide concentration, said method comprising the steps of: subjecting the crude natural gas feed stream to a separation process to provide: a purified natural gas stream having a second carbon dioxide content which is lower than the first carbon dioxide concentration in said crude natural gas stream; and, a carbon dioxide stream comprising carbon dioxide as the major component and methane; recovering the purified natural gas steam; optionally mixing the carbon dioxide stream with make-up methane and/or make-up air; passing the carbon dioxide stream and optional make-up methane or air through a heat exchanger to raise the temperature of the stream to the desired inlet temperature $T_1$ of an oxidation reactor; optionally mixing the carbon dioxide stream with make-up methane and/or make-up air; passing the heated stream from step (d) and any optional make-up methane and/or air to the oxidation reactor containing an oxidation catalyst, where the methane is oxidised; removing a gas (Continued)

stream including the products of the oxidation reaction from the reactor, said gas stream being at an outlet temperature $T_2$ which is higher than the inlet temperature $T_1$; passing the gas stream removed in step (g) through the heat exchanger against the carbon dioxide stream from step (a) to allow the heat to be recovered from the gas stream removed in step (g) and utilised to heat the carbon dioxide stream in step (d); and measuring the outlet temperature $T_2$ and controlling the inlet temperature $T_1$ by adjusting the amount of make-up methane and/or air added in step (c) and/or step (e).

20 Claims, 6 Drawing Sheets

(51) Int. Cl.
*B01D 53/90* (2006.01)
*C10L 3/10* (2006.01)

(52) U.S. Cl.
CPC ............. *B01D 53/90* (2013.01); *C10L 3/104* (2013.01); *B01D 53/225* (2013.01); *B01D 2251/11* (2013.01); *B01D 2251/208* (2013.01); *B01D 2255/1021* (2013.01); *B01D 2255/1023* (2013.01); *B01D 2255/1028* (2013.01); *B01D 2256/22* (2013.01); *B01D 2256/245* (2013.01); *B01D 2257/504* (2013.01); *B01D 2257/7025* (2013.01)

(58) Field of Classification Search
CPC ................ B01D 53/229; B01D 53/864; B01D 53/8696; B01D 53/94; B01D 53/944; B01D 2251/208; B01D 5527/504; C10L 3/104
See application file for complete search history.

(56) References Cited

U.S. PATENT DOCUMENTS

| 2012/0121497 | A1 | 5/2012 | Terrien et al. |
| 2012/0189523 | A1 | 7/2012 | Ohtsuka et al. |
| 2013/0061753 | A1* | 3/2013 | Fujisawa ............ B01D 53/1493 95/141 |
| 2013/0098242 | A1 | 4/2013 | Ungerank et al. |
| 2014/0110945 | A1* | 4/2014 | Takahashi ............... F01D 15/10 290/54 |
| 2016/0256820 | A1* | 9/2016 | Kulkarni ............. B01D 53/229 |

FOREIGN PATENT DOCUMENTS

| CN | 101418702 A | 4/2009 | |
| CN | 201301726 | 9/2009 | |
| CN | 201650343 | 11/2010 | |
| CN | 101906986 A | 12/2010 | |
| CN | 102205207 A | 10/2011 | |
| CN | 102218286 A | 10/2011 | |
| CN | 102225321 A | 10/2011 | |
| CN | 102230393 A | 11/2011 | |
| CN | 202322831 | 7/2012 | |
| EP | 2762220 A1 | 8/2014 | |
| WO | WO 2009/157434 A1 * | 12/2009 | ............ B01D 53/94 |
| WO | WO2009157434 A1 | 12/2009 | |
| WO | WO2010129413 A1 | 11/2010 | |

OTHER PUBLICATIONS

GB1603378.9, Search Report dated Sep. 22, 2016.
PCT/GB2016/050510, International Search Report dated May 27, 2016.

* cited by examiner

PRIOR ART

Figure 1

PRIOR ART

PROCESS FOR REMOVING $CO_2$ FROM CRUDE NATURAL GAS

CROSS-REFERENCE TO RELATED APPLICATIONS

This application is a National Stage of International Patent Application No. PCT/GB2016/050510 filed Feb. 26, 2016, which claims from the benefit of Great Britain Patent Application No. 1504130.4 filed Mar. 11, 2015, the disclosures of each of which are incorporated herein by reference in their entirety.

The present invention relates to a process for treating natural gas to minimise the methane flared and/or vented.

Natural gas is a fossil fuel which comprises a hydrocarbon gas mixture consisting primarily of methane. However, it will generally also include water, carbon dioxide, nitrogen and hydrogen sulphide. Natural gas is found in underground rock formations and is often located in combination with, or close proximity to, other hydrocarbon fuels such as coal or petroleum.

The world uses close to 100 trillion scf (standard cubic feet) of natural gas every year. All of this gas requires treatment before it enters the pipeline. The treatment required will depend on the source of the natural gas and hence the impurities present. Some will simply require the removal of water. However, over 20% requires extensive treatment, making natural gas processing by far the largest market for industrial gas separation processes and equipment.

Carbon dioxide is a common contaminant of natural gas and must be removed to a level of less than about 8 mole %, usually less than about 2 mole %, to minimize corrosion of the pipeline.

Historically, the standard technique for the removal of carbon dioxide from natural gas was amine absorption. Whilst this achieves almost complete removal of carbon dioxide, generally about 1% of the methane in the treated gas is lost with the carbon dioxide vent gas stream and another about 1% to about 4% of the methane has to be used as fuel to heat the reboiler of the amine stripper. Thus, the total hydrocarbon losses are in the range of about 2 to about 5%. Amine plants may still be used for treating natural gas having a low concentration of carbon dioxide.

However, over recent years, the use of membrane plants to remove the carbon dioxide is being increasingly accepted. Currently membrane-based treatment plants account for less than about 5% of treatment processes; the majority of which is for the removal of carbon dioxide. However, membrane-based removal of natural gas contaminants is growing faster than any other segment of the membrane gas separation business.

Generally membrane plants are used to treat natural gas streams which have a high concentration of carbon dioxide. Whilst they can be used for streams having a low carbon dioxide concentration these are generally less efficient. This means that a membrane plant designed to treat 5 million scfd of gas that contains 20% carbon dioxide would be less than half the size of a membrane plant designed to treat 20 million scfd of gas that contains 5% carbon dioxide.

Various designs of membrane plant have been considered. The intended location of the plant will dictate which factors are the most important to be considered in the design. Where the plant is to be located on an offshore platform, the weight and footprint of the plant are critical. It is also essential that the plant is simple to operate. In contrast, whilst these factors may play a part in the design of an onshore plant, costs of construction and operation are of more significance when making decisions on design.

Figure 1:
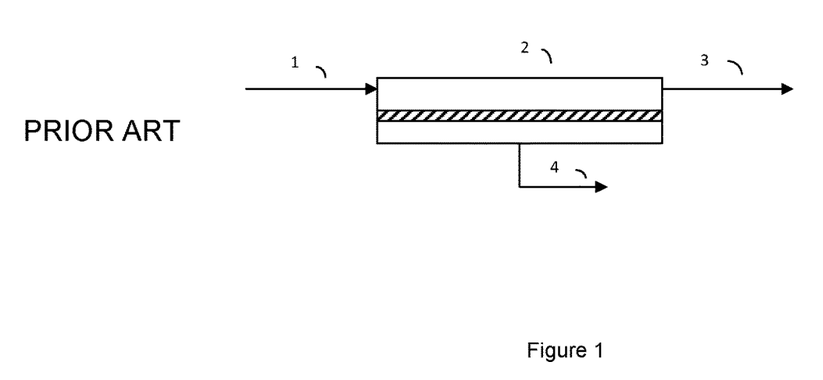
FIG. 1 is a schematic illustration of a prior art one-stage carbon dioxide removal process.
Figure 2:
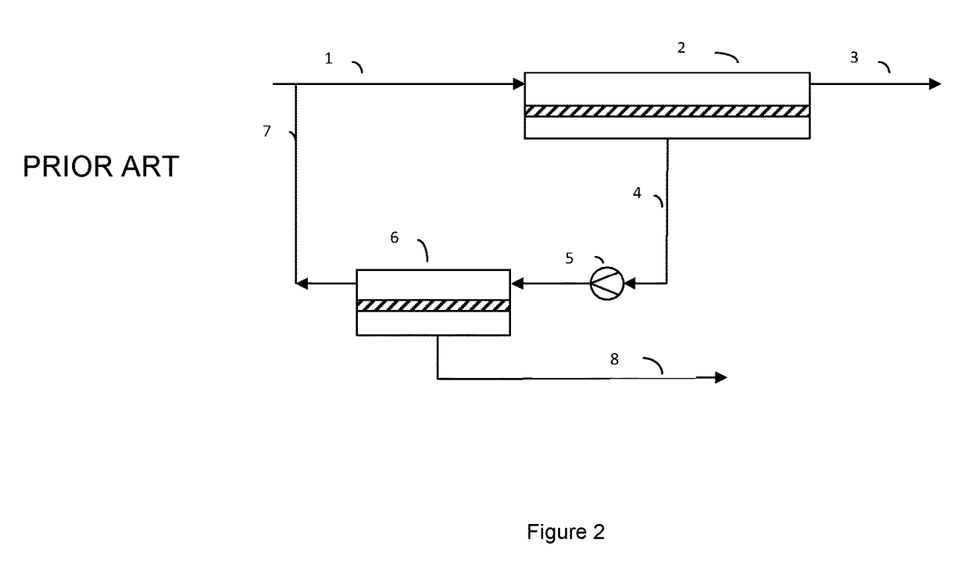
FIG. 2 is a schematic illustration of a prior art two-stage carbon dioxide removal process.

A schematic representation of two typical membrane-based carbon dioxide removal plants that treat natural gas with low carbon dioxide concentration are illustrated in FIGS. 1 and 2. Both plants are designed to treat 10 million scfd of gas that contain about 10% carbon dioxide.

A one-stage plant is illustrated in FIG. 1. Plants of this type are simple, contain no rotating equipment and require minimal maintenance. Plants of this type are therefore preferred for small gas flows, such as for gas wells that produce less than 1 MMscfd, as they require low capital and operating costs. In one example, a stream of natural gas having a concentration of about 10% carbon dioxide can be fed in line 1 to the membrane separator 2. In the arrangement illustrated in FIG. 1, the membrane separator may be a 1800 $m^2$ membrane. The gas may be fed at a flow rate of about $2.8 \times 10^5$ $m^3$/day and a pressure of about 800 psia. The stream of natural gas recovered in line 3 will still contain some carbon dioxide but it will have reduced to about 2%. The permeate stream 4 from the membrane separator 2 will contain about 44% carbon dioxide. The stream will be at a pressure of about 25 psia. The methane in the permeate stream 4, which is a loss to the natural gas stream 3, will represent about 11.5% and as such is significant.

Generally, the amount of methane loss will depend on the membrane used, the initial gas stream etc, but it will generally be in the region of about 10 to about 15%. If there is no fuel use for this gas, it must be flared, which represents a significant revenue loss. As the natural gas stream increases in size, the methane loss from a one-stage system and the resultant loss in revenue make this system unattractive.

In an attempt to mitigate the loss an alternative process has been considered which is illustrated schematically in FIG. 2. In this arrangement, a feed stream 1 is fed to a first membrane separator 2. The retentate stream recovered in line 3 will contain about 2% carbon dioxide. The permeate stream 4 from the first membrane separator 2 is compressed in compressor 5 and passed to a second membrane separator 6. The second membrane separator 6, may be of a smaller size than the first membrane separator 2. In one arrangement, the first membrane separator 2 is a 2000 $m^2$ separator and the second membrane separator 6 is a 300 $m^2$ separator. A retentate stream recovered in line 7 may be returned to the inlet of the first membrane separator 2. The permeate stream 8 will generally comprise about 86% carbon dioxide and the methane loss will be reduced to about 1.5%, which is comparable to amine plant losses.

Figure 3:
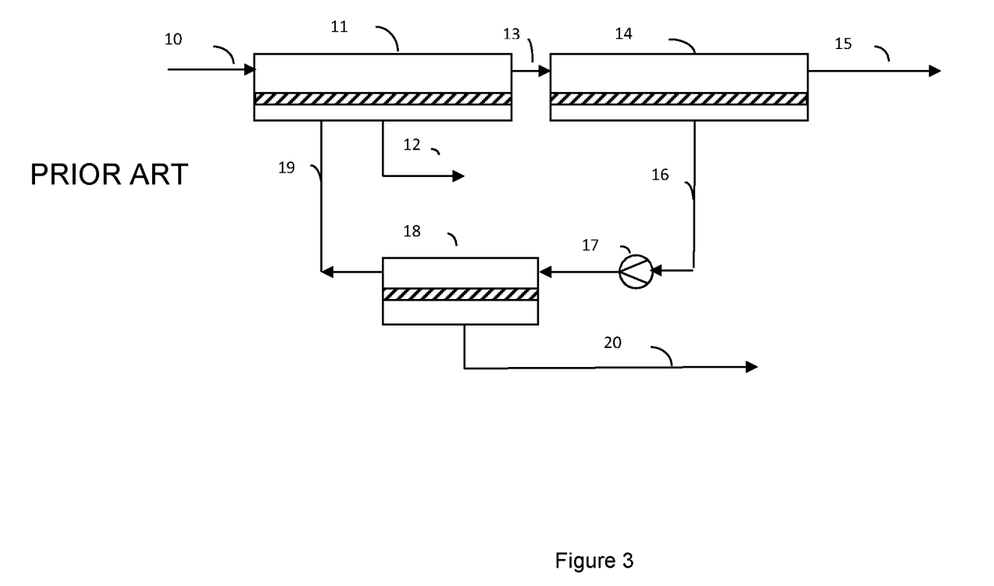
FIG. 3 is a schematic representation of an alternative prior art carbon dioxide removal process.

An alternative arrangement is illustrated in FIG. 3, which illustrates a process that might be used to treat a high carbon dioxide concentration gas on an offshore platform. The design combines the principles of the one-stage and two-stage systems described above. In one example, a stream comprising 30% carbon dioxide is fed in line 10 to a 7500 $m^2$ first membrane separator 11 at a pressure of 500 psia and a flow rate of $14 \times 10^5$ $Nm^3$/day. A permeate having a 1.5% carbon dioxide content is removed in line 12. The natural gas retentate stream 13 is passed to a second 7500 $m^2$ membrane separator 14. The natural gas retentate recovered in line 15 will be at a pressure of 500 psia and will be recovered at a rate of about $9.9 \times 10^5$ $Ne$/day. This stream will contain about 81.5% carbon dioxide.

The permeate stream 16 from the second membrane separator 14 will contain about 56% carbon dioxide. This stream is compressed in compressor 17 before being passed to a third membrane separator 18. This third membrane separator 18 will generally be smaller than the first and second membrane separators, 11 and 14, and in one arrangement may be a 730 m$^2$ membrane. The retentate stream 19, which will contain about 30% carbon dioxide, is returned to the first membrane separator 11. The permeate from the third membrane separator 18 is removed in line 20. This stream comprises about 93.1% carbon dioxide. Streams 12 and 19 may both be vented or stream 12 may be flared.

Thus this process reduces the carbon dioxide concentration in the natural gas from 15% to about 8%. This is still well above the U.S. gas pipeline specification, but is low enough to control the corrosion of dry gas. This means that the gas can be piped to shore, where the remaining carbon dioxide can be removed.

The process design shown in FIG. 3 will provide a methane loss with the carbon dioxide streams of about 7%. This loss could be reduced by increasing the size of the compressor 17 and membrane separator unit 18. Whilst this can be option on onshore plants, the increase in weight, footprint, power consumption and other cost-of-plant factors for offshore plants may not be offset by the value of the extra gas recovered.

However formed, the permeate stream(s) that have been separated from the natural gas feed, and which generally comprise a high percentage of carbon dioxide, have to be managed. Similar problems arise where the contaminants of the natural gas stream are removed by other methods.

Generally, waste gas is released to the atmosphere by flaring and venting. Flaring is the controlled burning of natural gas produced in association with oil in the course of routine oil and gas production operations. Venting is the controlled release of unburned gases directly into the atmosphere. The availability of a flare or a vent ensures that gas can be safely disposed of in emergency and shut down situations. Further, where gas cannot be stored or used commercially, the risk of fire and explosion must be reduced by either flaring or venting.

According to the World Bank's Global Gas Flaring Reduction Program, 150 billion cubic meters (5.3 trillion cubic feet) of natural gas are being flared and vented annually. This is roughly equivalent to the gas use in all US residences for 1 year and represents about 5% of global natural gas production per year. It will therefore be understood that this loss of methane through the venting and/or flaring of gases represents a loss of valuable components and it is therefore in an oil company's interest to minimise the amount of gas flared in order to realise as much value as possible from the hydrocarbons being produced.

Various suggestions have been made to utilise this gas including local power generation, re-injection into the well or micro-gas to liquid Fischer-Tropsch reactions. However, these methods are not always easily implemented, particularly when space is limited. In particular, it may not be technically or economically feasible to sell some or all of the gas, for reasons that are often a combination of geography, availability of customers and government energy policies. Similarly, it may not be technically or economically feasible to re-inject the gas into underground reservoirs. Therefore, gas may have to be flared as a waste product. In some cases, venting may be preferable to flaring, depending on considerations such as local noise impacts, toxicity of gases being produced and the hydrocarbon content of the gas. If gas is to be flared, it is also in the company's interest to increase the carbon dioxide content and thereby reduce the methane content of the waste gas to obtain as much value as possible from the natural gas.

Not only does flaring and venting have an economic impact, they have a local environmental impact too since they produce emissions which are argued to have the potential to contribute to global warming. Available data indicates that, on a worldwide basis, gas flaring contributes 1% of anthropogenic carbon dioxide emissions, while flaring and venting contribute 4% of anthropogenic methane emissions. The industry has therefore sought to reduce flaring and/or minimise its impact through commercialisation of gas reserves, improvements in operation, maintenance and design of flare systems, as well as new ways of storing associated gas.

It is therefore apparent that whilst there are some proposals for addressing the problems associated with waste gases from the processing of natural gas, it is clear that there has been no solution which is acceptable in all situations. It is therefore desirable to provide an alternate approach which may offer advantages in at least some of the situations were streams have to be vented.

There have been some suggestions in connection with ventilation gas from mines that the ventilation gas should be subjected to oxidation in the presence or absence of a suitable catalyst so that the methane present in the gas is oxidised to carbon dioxide and water before it is vented. Examples of oxidation systems are described in CN102230393, CN102225321, CN102218286, CN102205207, CN101418702, CN101906986, CN201301726, CN201650343, and CN101206027.

In oxidation processes, it is generally necessary to heat the gas prior to its contact with the catalyst. However, these processes can be difficult to operate. One problem is that the temperature in the reactor has to be controlled such that it is high enough that reaction will occur but such that it is not too high, since high temperatures can damage and even deactivate the catalyst.

The need to control the temperature during the oxidation process can be complicated where the concentration of gas in the gas stream being treated fluctuates.

One suggested process for dealing with utilising the gas streams having a low but fluctuating concentration of methane in the ventilation gas from a coal mine is discussed in US2012/0189523. In a first arrangement the proposed method comprises feeding the gas through a heat exchanger in which it is preheated. This preheated gas is then fed to a reactor in which it is contacted with an oxidation catalyst such that the oxidation reaction occurs. The reacted gas is then passed through the heat exchanger such that the heat is recovered by heat exchange with the unreacted gas. The method also includes varying the amount of gas that is fed to the oxidation catalyst depending on the concentration of methane in the gas to be treated such that the gas flow rate is increased when the methane concentration is high and is decreased when the methane concentration is low.

In a second arrangement described in US2012/0189523, the gas to be treated is passed through a low temperature passageway to a heat exchanger so that it is heated. The preheated gas is then fed to a reactor where it is contacted with the oxidation catalyst where the desired oxidation reaction occurs. The reacted gas is then passed through the heat exchanger to allow for heat exchange with the feed gas. In this arrangement some of the stream to the low temperature side or to the high temperature side of the heat exchanger may be passed through a shortcut passageway such that the heat exchanger can be bypassed by a portion of the gas. The ratio of the feed gas to be fed through the shortcut passageway relative to the amount to be fed to the heat exchanger is allowed to vary such that the lower the ratio, the lower the concentration of methane in the feed gas and the higher the ratio, the higher the concentration of methane in the feed gas.

Whilst this process offers some means of handling methane in a gas stream it does not relate to the handling of a stream separated from a natural gas stream and which has a high concentration of carbon dioxide.

It is therefore desirable to provide a process which provides an alternative arrangement and which is applicable to the treatment of a stream of natural gas.

Thus according to a first aspect of the present invention there is provided a method for treating a crude natural gas stream stream comprising methane and having a first carbon dioxide concentration, said method comprising the steps of:

(a) subjecting the crude natural gas feed stream to a separation process to provide: a purified natural gas stream having a second carbon dioxide content which is lower than the first carbon dioxide concentration in said crude natural gas stream; and, a carbon dioxide stream comprising carbon dioxide as the major component and methane;

(b) recovering the purified natural gas steam;

(c) optionally mixing the carbon dioxide stream with make-up methane and/or make-up air;

(d) passing the carbon dioxide stream and optional make-up methane or air through a heat exchanger to raise the temperature of the stream to the desired inlet temperature $T_1$ of an oxidation reactor;

(e) optionally mixing the carbon dioxide stream with make-up methane and/or make-up air;

(f) passing the heated stream from step (d) and any optional make-up methane and/or air to the oxidation reactor containing an oxidation catalyst, where the methane is oxidised;

(g) removing a gas stream including the products of the oxidation reaction from the reactor, said gas stream being at an outlet temperature $T_2$ which is higher than the inlet temperature $T_1$;

(h) passing the gas stream removed in step (g) through the heat exchanger against the carbon dioxide stream from step (a) to allow the heat to be recovered from the gas stream removed in step (g) and utilised to heat the carbon dioxide stream in step (d); and (i) measuring the outlet temperature $T_2$ and controlling the inlet temperature $T_1$ by adjusting the amount of make-up methane and/or air added in step (c) and/or step (e).

The gas stream recovered from the oxidation reactor will have a reduced concentration of methane as it will have been converted to carbon dioxide and water. Thus once this stream has been passed through the heat exchanger in step (h) it can be vented. Since this stream has a substantially reduced concentration of methane, its venting does not have the environmental impact that is noted with prior art arrangements.

In one arrangement, once the stream has been passed through the heat exchanger in step (h) it may be fed through an expansion turbine in which it is expanded before being vented. The expansion turbine may supply power to an electrical generator for electrical power production which may be used to provide power to the process. Partial liquefaction of the expanded gas may occur in the expansion turbine. Depending on the temperature of the stream to the expansion turbine, it may be possible to recover further heat from the exit gas from the expansion turbine before it is vented.

The "crude" natural gas stream may be a natural gas stream which has not undergone any purification or it may have already undergone treatment to remove impurities which may include carbon dioxide removal. However it is "crude" in the sense that it has a higher carbon dioxide content than the purified natural gas steam.

The crude natural gas stream can comprise any suitable amount of carbon dioxide. In one arrangement, it may comprise up to 25% carbon dioxide. The process is particularly suitable for use with a natural gas stream comprising about 20% carbon dioxide. However, contents of about 15%, 12%, 10%, 8% may be used.

Any suitable separation process can be used to separate the crude natural gas stream to form the purified natural gas stream and the carbon dioxide stream.

In a preferred arrangement, the separation process is a membrane separation process.

In one arrangement, the crude natural gas is treated in a single membrane separator. In this arrangement, the retentate from the membrane separator is the purified natural gas stream and the permeate is the carbon dioxide stream comprising methane.

In one alternative arrangement, the crude natural gas may be treated in a first membrane separator to form a retentate comprising the purified natural gas stream. In this arrangement, the permeate from the first membrane separator is passed to a second membrane separator. The permeate stream may be compressed before being passed to the second membrane separator. It is the permeate from this second membrane separator which is the carbon dioxide stream that is subjected to steps (c) to (i) above. The retentate from the second membrane separator may be returned to the first membrane separator. The first and second membrane separators may be the same or different.

In a second alternative arrangement, the crude natural gas may be treated in first and second membrane separators in series to form a retentate comprising the purified natural gas stream. The permeate from one or both of the first and second membrane separators is passed to a third membrane separator. The permeate stream may be compressed before being passed to the third membrane separator. If one of the permeate streams is not passed to the third membrane separator it may be subjected to the steps (c) to (i) above or it may be flared or vented. The retentate from the third membrane separator may be returned to the first membrane separator. The permeate from the third membrane separator will be subjected to steps (c) to (i) above.

It will be understood that by controlling the inlet temperature $T_1$ to the oxidation reactor, the outlet temperature $T_2$ is controlled.

The ability to control the temperatures is important to maximise the life of the catalyst. Absent this, temperature-caused degradation of the catalyst can occur. $T_1$ will generally be fixed within an operation range that does not allow $T_2$ to exotherm above the maximum operation temperature of the catalyst. However, variations in the concentration of the methane in the carbon dioxide stream will cause fluctuations in the observed exotherm and hence variations in $T_2$. This variation has to be controlled to be below the maximum allowable figure for $T_2$ but also has to be controlled to generate the desired bed inlet temperature $T_1$.

The outlet temperature $T_2$ is compared with a pre-determined desired temperature and the amount of make-up air added is adjusted. If the make-up air is added, the inlet temperature $T_1$ is reduced. However, $T_1$ will not be adjusted to a temperature which is below a minimum reaction initiation temperature. The addition of make-up air not only reduces $T_1$, but also acts to decrease the methane concentration further, such that the exothermic reaction in the reactor occurs less and the temperature rise within the reactor is thereby decreased.

Where make-up methane is added, as the methane concentration increases, the exit temperature $T_2$ will increase. Thus, if the temperature $T_1$ is too low to enable operation of the catalyst, addition of make-up methane to increase the methane concentration will increase $T_2$ such that a hotter stream is passed through the heat exchanger which in turn will lead to the feed stream temperature increasing as it passes through the heat exchanger, thereby increasing $T_1$. The addition of make-up methane is therefore preferably done at step (b), such that the methane is also heated in the heat exchanger in step (c).

In one arrangement, both make-up air and make-up methane can be used. If the temperature $T_2$ increases, make-up air can be mixed with the carbon dioxide stream, thereby reducing $T_2$, as discussed above. If the temperature $T_2$ decreases, make-up methane can be mixed with the carbon dioxide stream, thereby increasing $T_2$, as discussed above.

In one arrangement, a portion of the carbon dioxide stream may by-pass the heat exchanger in step (d). Make-up air may be added to the by-pass stream. The by-pass stream will then be supplied to the oxidation reactor with the stream from step (b). It will be understood that alternatively or additionally make-up air may be added at other points in the system.

Mixing the by-pass stream which has not been heated in the heat exchanger with the heated carbon dioxide stream enables the temperature $T_1$ to be controlled. The amount of carbon dioxide stream bypassing the heat exchanger may be increased as the methane concentration increases, which would otherwise result in an increase in the reactor exit temperature. If $T_2$ decreases to a predetermined point, the amount of carbon-dioxide stream by-passing the heat exchanger may be decreased, so that the temperature of the catalyst is maintained in the desired range.

Any suitable reactor configuration may be used. In one arrangement, the reactor may comprise two or more sub-reactors in series. There may be three sub-reactors located in series. Where the reactor comprises two or more sub-reactors in series, a heat exchanger may be located between some or all of the reactors. Thus a heat exchanger may be located between a first and second sub-reactor and/or between a second and third sub-reactor.

In one arrangement, after the carbon dioxide stream and optional make-up methane or air is passed through a heat exchanger to raise the temperature of the stream to the desired inlet temperature $T_1$ of the reactor. The stream is then passed to the first sub-reactor where it contacts the catalyst and reaction occurs. The temperature will be increased as the reaction occurs. The stream from the first sub-reactor may be passed through a second heat exchanger where it is cooled before being passed to a second sub-reactor where further reaction occurs. The hot stream recovered from the second sub-reactor is then passed sequentially through the first and second heat exchanges. As it passed through the first heat exchanger it is cooled and heats the feed to the first sub-reactor. As the stream is then passed through the second heat reactor, it is heated against the cooling stream from the first sub-reactor to a temperature which is suitable for being passed to the third sub-reactor where further reaction may occur.

Where there are a plurality of sub-reactors in series, make-up air may be added at any suitable point in the process. In one arrangement, it may optionally be added to the stream before each of the sub-reactors or to a selection thereof.

Any suitable catalyst may be used in the oxidation reactor. In one arrangement, the catalyst may be iridium and platinum dispersed on a carrier such as an oxidic carrier. Examples of suitable carriers include zirconia, titania, alumina or a mixture thereof. In an alternative arrangement, the catalyst may be palladium and/or platinum on a support. The catalyst may be presented in any suitable configuration but in one arrangement it may be as a coated substrate, such as a metallic or ceramic honeycomb configuration. Where two or more sub-reactors are used to form the reactor the same or different catalysts may be used in the sub-reactors.

The desired temperature will depend on the catalyst used. Where the catalyst contains palladium and/or platinum on a support, $T_1$ is preferably at least 300° C. and may be at least 350° C. Temperatures above 650° C. will generally be avoided to maximise the catalyst life and minimise the reactor costs. $T_2$ may be controlled to be below about 600° C. and may be below about 580°. More preferably, $T_1$ is above about 373° C. and $T_2$ is below about 580° C.

Where the reactor comprises two or more sub-reactors in series, the temperature in each sub-reactor may be the same or different and may depend on the catalyst selected.

As the heated carbon dioxide stream is passed over the catalyst, the methane is oxidised to carbon dioxide and water.

The reactor may be of any suitable configuration but will generally be adiabatic.

In one arrangement, the flow rate to the reactor will be maintained constant.

It will be understood that the make-up methane optionally added in step (c) or (e) may be methane or a gas stream comprising methane. In this latter arrangement, a methane rich stream is preferred. Methane produced from the natural gas feed may be used.

The, or each, heat exchanger may be of any suitable configuration. In one arrangement, a plate heat exchanger may be used.

Thus the present invention allows the system to take account of fluctuations in the methane concentration to the oxidation reactor. The arrangement is sufficiently flexible to quickly vary the amount of make-up methane or make-up air while keeping the overall flow to the catalyst bed fixed, thereby maintaining the temperature in the reactor within the desired range.

A fired start-up heater or other suitable heating method may be provided to heat the reactor to operating conditions.

As the catalyst deactivates, the exit gas from the reactor will start to contain methane. The presence of methane in the exit stream can be detected. The methods discussed herein may then allow $T_1$ to be increased until there is no further methane in the stream removed from the reactor. Once $T_2$ has reached its maximum and the overall methane conversion falls then the catalyst will need to be replaced. Generally, the minimum catalyst life is one year.

The methane concentration in the stream obtained from the reactor may be detected by any suitable means. In one arrangement, it may be measured using a non-dispersive infrared absorption analyser that utilises a solid state detector, which gives continuous monitoring of methane down to 1 ppm or lower.

Any suitable gas flow rate may be used. In one arrangement, there may be a gas hourly space velocity of about 20,000 Lgas/Lcatalyst/hr with a linear velocity at the front face of the catalyst of about less than 20 m/s, preferably less than 10 m/s.

In any of the embodiments discussed above, the heated gas recovered from the oxidation reactor may be utilised to generate energy. A conventional steam to power generator may be used. The stream from the oxidation reactor will generally be used to generate energy before it is passed through the heat exchanger in step (h). However, it may pass through the heat exchanger first. It will be understood that the heated gas may be put to alternative uses.

The present invention will now be described by way of example with reference to the accompanying drawings in which.

It will be understood by those skilled in the art that the drawings are diagrammatic and that further items of equipment such as reflux drums, pumps, vacuum pumps, temperature sensors, pressure sensors, pressure relief valves, control valves, flow controllers, flow control dampers, duct work, flame arresters, level controllers, holding tanks, storage tanks and the like may be required in a commercial plant. The provision of such ancillary items of equipment forms no part of the present invention and is in accordance with conventional chemical engineering practice.

Figure 4:
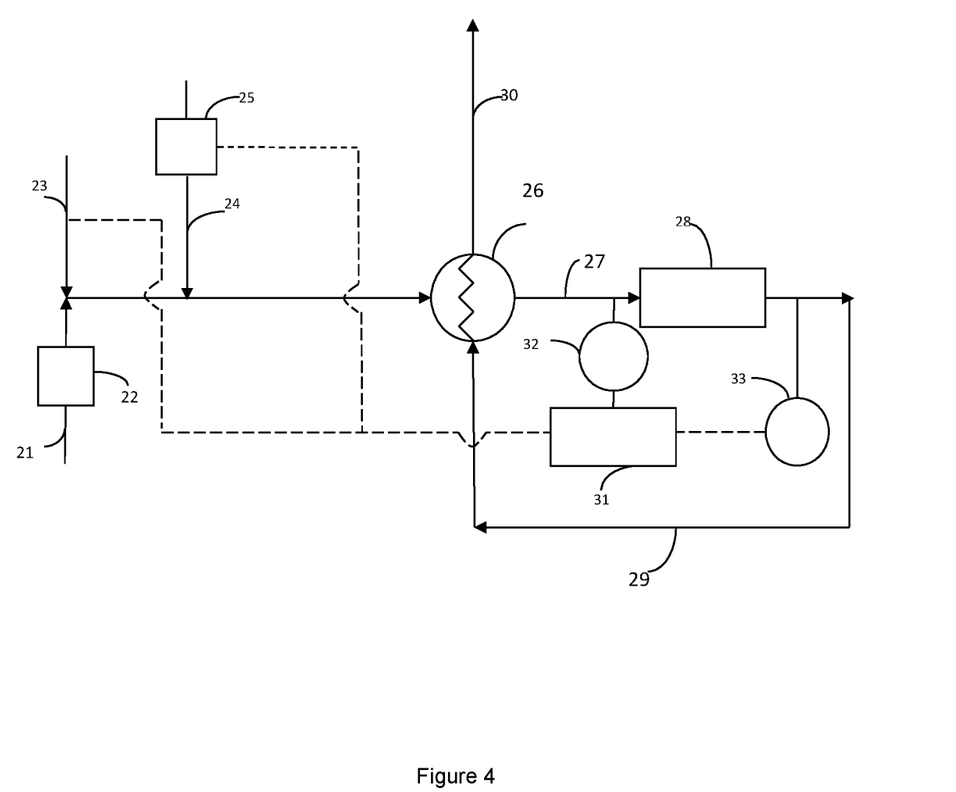
FIG. 4 is a schematic illustration of a flow sheet according to one aspect of the present invention.

As illustrated in FIG. 4, a carbon dioxide stream recovered from a crude natural gas feed separation process (not shown) is fed in line 21 using a fan 22 where it is mixed with optional make-up methane, generally in the form of a methane-rich gas, in line 23 and/or optional make-up air in line 24, supplied by fan 25. The gas is then fed to heat exchanger 26, where it is heated to a temperature $T_1$ and then fed in line 27 to the oxidation reactor 28 which comprises the catalyst. In the oxidation reactor the methane is converted to carbon dioxide and water. The gas stream, which will have been heated during the exothermic reaction to the temperature $T_2$, is then removed from the reactor in line 29, where it is passed through the heat exchanger 26 against the incoming feed in line 21 such that it is cooled and the feed stream is heated. The cooled product gas is then removed in line 30.

A controller 31 monitors the temperatures $T_1$ and $T_2$ measured in detectors 32 and 33 and controls the make-up methane and make-up air supplies as appropriate.

Figure 5:
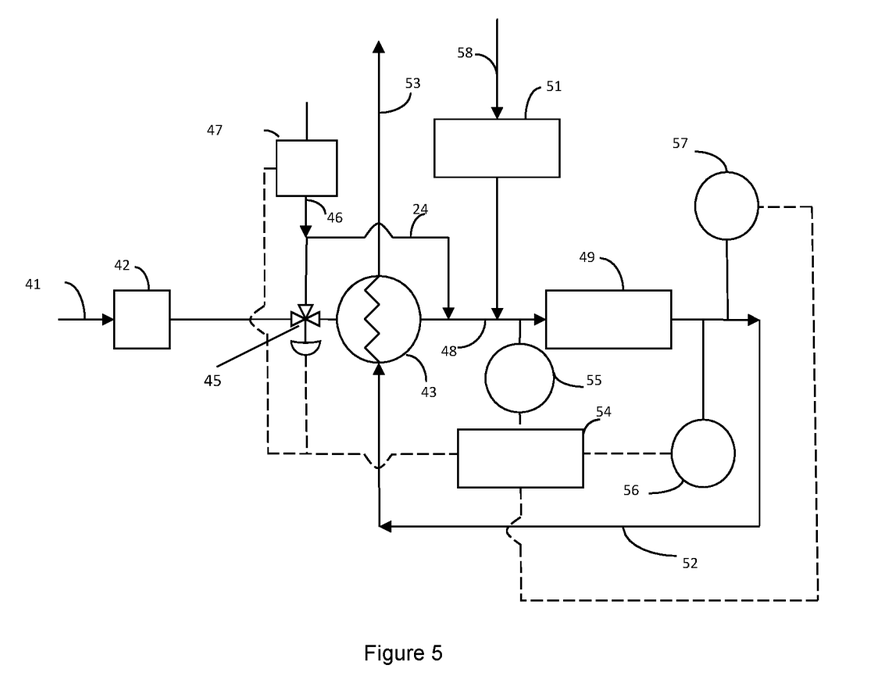
FIG. 5 is a schematic illustration of a flow sheet according to a second aspect of the present invention.

In the alternative arrangement illustrated in FIG. 5, a carbon dioxide stream recovered from a crude natural gas feed separation process (not shown) is fed to the process in line 41 using the main fan 42 and is then passed to the heat exchanger 43, where it is heated. A portion of the crude natural gas feed may be bypassed around the heat exchanger 43 in line 44 and then mixed with the heated gas. A valve 45 controls the bypass. Make-up air may be added into the bypass stream in line 46 using fan 47. At start up, methane may be added in line 58 having been passed through the start-up burner 51. It is also possible to add methane via line 58 which bypasses the start-up burner during normal operation.

The stream is then fed in line 48 to the reactor 49, where reaction occurs. The gas stream is then removed from the reactor 49 in line 52 and passed through the heat exchanger 43, where it is cooled while heating the incoming gas. The cool gas is then released in line 53.

A controller 54 monitors the temperatures $T_1$ and $T_2$ measured in detectors 55 and 56 and exit methane analyser 57. The controller then adjusts the amount of waste gas bypassing the heat exchanger 43 using valve 45 and the amount of make-up air added in line 46.

Figure 6:
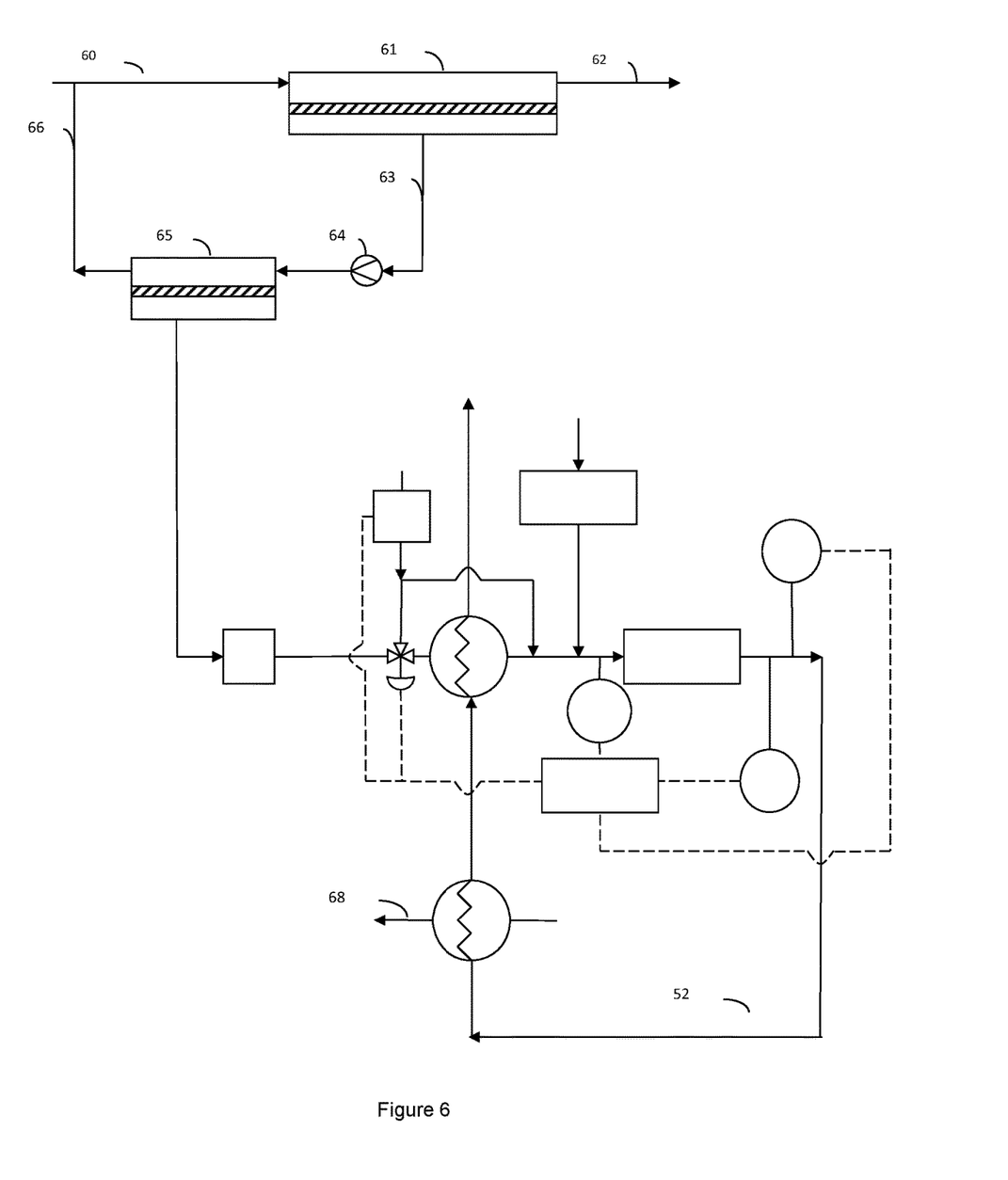
FIG. 6 is a schematic illustration of a flow sheet according to the second aspect of the present invention in combination with the carbon dioxide removal plant shown in FIG. 2.

FIG. 6 shows the schematic illustration of FIG. 5 in combination with the carbon dioxide removal plant of FIG. 2. A crude natural gas feed stream is fed in line 60 to a first membrane separator 61. In one arrangement, the stream may have a concentration of 10% carbon dioxide. A retentate comprising a purified natural gas stream having a lower carbon dioxide concentration is recovered in line 62. This stream may have a carbon dioxide concentration reduced to about 2%.

The permeate from the first membrane separator 61 will have a higher carbon dioxide concentration than in the feed to the membrane, generally about 44%. This permeate stream 63 is passed to a second membrane separator 65 via a compressor 64. Further carbon dioxide is removed from the stream 63 in the second membrane separator 65.

The retentate from the second membrane separator 65 is fed back to the first membrane separator 61. The permeate 67 from the second membrane separator 65 contains a high concentration of carbon dioxide, generally about 86%. This permeate is then passed in line 41 to the process illustrated in FIG. 5.

As illustrated in FIG. 6 optionally the stream recovered from the reactor 49 in line 52 is passed to a steam to power generator 68 before being passed to the heat exchanger 43.

Figure 7:
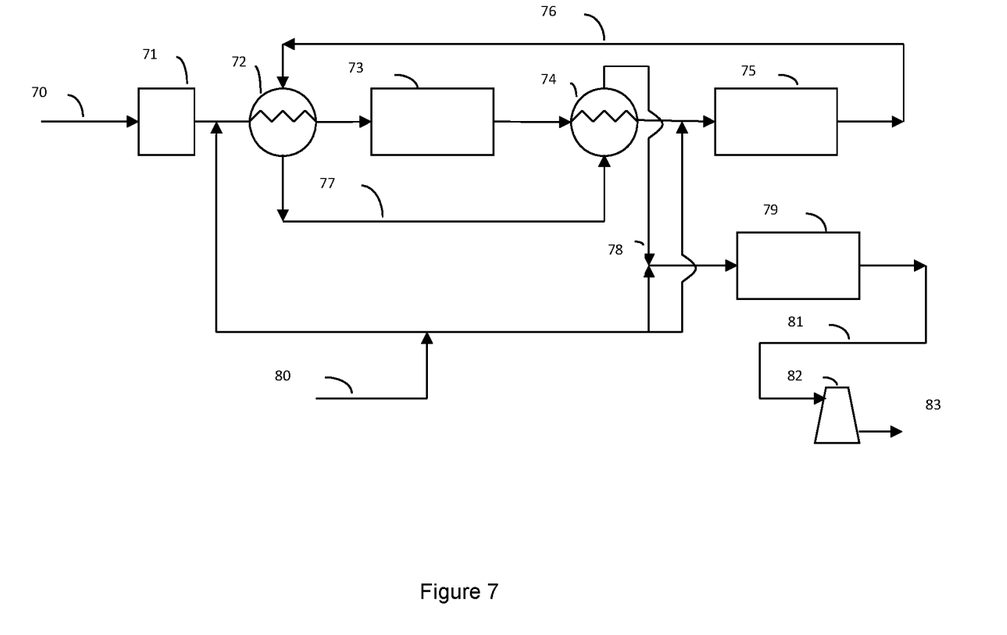
FIG. 7 is a schematic illustration of a flow sheet according to a third aspect of the present invention.

An alternative arrangement is illustrated in FIG. 7. In this arrangement, the purified gas stream in line 70 is passed from the membrane separation stage, not show, to a first heat exchanger 72. During start-up, the purified gas stream may be passed through a start-up heater such as a start-up burner 71. In the first heat exchanger 72 the stream is heated to a suitable inlet temperature before it is passed to a first sub-reactor 73 which comprises the catalyst. where a portion of the methane is oxidised to produce carbon dioxide and water. This oxidation increases the temperature of the stream. Make-up air may be fed in line 80 into the stream before it is passed to the first heat exchanger 72. The amount of make-up air added may be varied to control the degree of oxidation which takes places in the first sub-reactor.

The stream recovered from the first sub-reactor 73 is passed to a second heat exchanger 74 where it is cooled before being passed to a second sub-reactor 75. Make-up air may be added to the stream in line 80 before it is added to the second sub-reactor 75. Further oxidation of the methane in the gas stream occurs in the second reactor 75. Again, the degree of oxidation may be controlled by the amount of make-up air added.

The exhaust gas from the second reactor 75 are recovered in line 76 and passed through the first heat exchanger 72 where it is cooled while heating the stream fed in line 70 to the first sub-reactor 73.

The cooled exhaust gas is then passed in line 77 to the second heat exchanger 74, where they are heated by the hot gases exiting the first sub-reactor 73. After being heated, the gas is passed to a third sub-reactor 79 where further oxidation occurs. Make-up air may be added to the third sub-reactor 79 to cool and dilute the hot gas from the second heat exchanger 75.

The exhaust gas from the third sub-reactor 79 are recovered in line 81 and are then passed to an expansion turbine 82 before being vented in line 83. Power generated in the expansion turbine may be utilised in the process of the invention.

The invention claim is:

1. A method for treating a crude natural gas feed stream comprising methane and having a first carbon dioxide concentration, said method comprising:
    (a) subjecting the crude natural gas feed stream to a separation process to provide: a purified natural gas stream having a second carbon dioxide content which is lower than the first carbon dioxide concentration in said crude natural gas stream; and, a carbon dioxide stream comprising carbon dioxide as the major component and methane;
    (b) recovering the purified natural gas steam;
    (c) optionally mixing the carbon dioxide stream with make-up methane and/or make-up air;
    (d) passing the carbon dioxide stream and optional make-up methane or air through a heat exchanger to raise the temperature of the stream to an inlet temperature $T_1$ of an oxidation reactor;
    (e) optionally mixing the carbon dioxide stream with make-up methane and/or make-up air;
    (f) passing the heated stream from step (d) and any optional make-up methane and/or air to the oxidation reactor containing an oxidation catalyst, where the methane is oxidised;
    (g) removing a gas stream including the products of the oxidation reaction from the reactor, said gas stream being at an outlet temperature $T_2$ which is higher than the inlet temperature $T_1$;
    (h) passing the gas stream removed in step (g) through the heat exchanger against the carbon dioxide stream from step (a) to allow the heat to be recovered from the gas stream removed in step (g) and utilised to heat the carbon dioxide stream in step (d); and
    (i) measuring the outlet temperature $T_2$ and controlling the inlet temperature $T_1$ by adjusting the amount of make-up methane and/or air added in step (c) and/or step (e).

2. The process according to claim 1, wherein the separation process is a membrane separation process.

3. The process according to claim 2, wherein the crude natural gas is treated in a single membrane separator and a retentate from the membrane separator is the purified natural gas stream and the permeate is the carbon dioxide stream comprising methane.

4. The process according to claim 2, wherein the crude natural gas is treated in a first membrane separator to form a retentate comprising the purified natural gas stream and a permeate which is passed to a second membrane separator, the permeate from the second membrane separator is the carbon dioxide stream comprising methane.

5. The process according to claim 4, wherein the permeate stream is compressed before being passed to the second membrane separator.

6. The process according to claim 2, wherein the crude natural gas is treated in first and second membrane separators in series to form a retentate comprising the purified natural gas stream, the permeate from one or both of the first and second membrane separators being passed to a third membrane separator, the permeate stream from the third membrane separator is the carbon dioxide stream comprising methane.

7. The process according to claim 6, wherein the permeate stream is compressed before being passed to the third membrane separator.

8. The process according to claim 1, wherein the reactor comprises two or more sub-reactors.

9. The process according to claim 8, wherein a product stream from a first sub-reactor is passed through a second heat exchanger before being passed to a second sub-reactor.

10. The process according to claim 9, wherein a product stream from a second sub-reactor is passed through one or both heat exchangers before being passed to a third sub-reactor.

11. The process according to claim 1, wherein the outlet temperature $T_2$ is compared with a pre-determined temperature and the concentration of the methane and/or air is adjusted such that the temperature rise occasioned by the reaction in the oxidation reactor results in the outlet temperature $T_2$ approaching the pre-determined temperature.

12. The process according to claim 1, wherein a portion of the carbon dioxide stream by-passes the heat exchanger in step (d).

13. The process according to claim 12, wherein make-up air is added to the by-pass stream.

14. The process according to claim 1, wherein the catalyst is iridium and platinum dispersed on a carrier.

15. The process according to claim 1, wherein $T_1$ is at least about 300° C.

16. The process according to claim 1, wherein $T_2$ is about 600° C. or below.

17. The process according to claim 1, wherein $T_1$ is about 373° C. or above and $T_2$ is about 580° C. or below.

18. The process according to claim 1, wherein the stream recovered from the reactor is passed through a steam to power generator.

19. The process according to claim 1, wherein the stream that has been passed through the heat exchanger in step (h) is passed through an expansion turbine before being vented.

20. The process according to claim 1, wherein $T_1$ is at least about 350° C.

* * * * *